United States Patent [19]

Raythatha

[11] Patent Number: 4,855,268

[45] Date of Patent: Aug. 8, 1989

[54] MIXED PILLARED CLAYS

[75] Inventor: Rasik H. Raythatha, Tennille, Ga.

[73] Assignee: E.C.C. America Inc., Atlanta, Ga.

[21] Appl. No.: 292,634

[22] Filed: Dec. 30, 1988

Related U.S. Application Data

[63] Continuation of Ser. No. 70,433, Jul. 7, 1987, abandoned.

[51] Int. Cl.$^4$ .......................... B01J 29/06; B01J 21/16
[52] U.S. Cl. ........................... 502/63; 502/80; 502/84; 501/148
[58] Field of Search .................... 501/148; 502/63, 80, 502/84

[56] References Cited

U.S. PATENT DOCUMENTS

| | | | |
|---|---|---|---|
| 4,176,090 | 11/1979 | Vaughan et al. | 502/84 |
| 4,216,188 | 8/1980 | Shabrai et al. | 502/63 |
| 4,238,364 | 12/1980 | Shabtai | 502/65 |
| 4,248,739 | 2/1981 | Vaughan et al. | 502/63 |
| 4,271,043 | 6/1981 | Vaughan et al. | 502/81 |
| 4,436,832 | 3/1984 | Jacobs et al. | 502/84 |
| 4,465,892 | 8/1984 | Jacobs et al. | 585/666 |
| 4,510,257 | 4/1985 | Lewis et al. | 502/84 |
| 4,515,901 | 5/1985 | Elattar | 502/84 |
| 4,621,070 | 11/1986 | Pinnavaia et al. | 502/63 |
| 4,629,712 | 12/1986 | Pinnavaia et al. | 502/63 |
| 4,637,991 | 1/1987 | Battiste et al. | 502/84 |
| 4,665,044 | 5/1987 | Pinnavaia et al. | 502/84 |
| 4,666,877 | 5/1987 | Vaughan | 502/84 |

OTHER PUBLICATIONS

Lee et al., "Pillared Clay Catalysts Containing Mixed-Metal Complexes", Journal of Catalysis, vol. 115 (1989), pp. 159–179.

Suib et al., "Comparison of the Photochemical and Photophysical Properties of Clays, Pillared Clays, and Zeolites", Journal Amer. Chem. Soc., vol. 108 (1986), pp. 6972–6977.

Carrado et al., "Chromium (III)–Doped Pillared Clays (PILC's)", Inorganic Chemistry, vol. 25 (1986), pp. 4217–4221.

*Primary Examiner*—Mark L. Bell
*Assistant Examiner*—Anthony J. Green
*Attorney, Agent, or Firm*—Klauber & Jackson

[57] ABSTRACT

Mixed pillared clays having good thermal stabilities and high surface areas are prepared by liquid phase methods in which either (a) a discrete multi-metallic hydroxy polymer having a definite chemical formula is prepared prior to mixing with a swelling clay or (b) at least two separate metal hydroxy polymers are prepared and mixed with the swelling clay in respective amounts to satisfy selected percentages of the cationic exchange capacity of the clay.

4 Claims, 5 Drawing Sheets

HYPOTHETICAL SCHEMATIC OF
BIMETALLIC OR MIXED POLYHYDROXY
METAL IONS PILLARED MONTMORILLONITE

CATALYTICALLY ACTIVE SPECIES ITSELF
ACTS AS PILLAR ALONG WITH INERT PILLARS

CATALYTICALLY ACTIVE CENTER M' INCORPORATED
IN INERT PILLARS OF METAL M

BASAL SPACINGS OF CLAYS AFTER
DRIVING AT ROOM TEMPERATURE.

BASAL SPACINGS OF CLAYS AFTER DRYING AT 550°C.

MIXED PILLARED CLAYS

This application is a continuation, of application Ser. No. 070,433, filed July 7, 1987, now abandoned.

FIELD OF THE INVENTION

This invention relates to a process of pillaring swelling clays with more than one metal cation.

BACKGROUND OF THE INVENTION

Naturally occurring clay minerals are regularly used in many applications. For example, catalyst, paper, plastic, health care, petroleum exploration and adsorbent applications are known. Of particular interest are clays known as swelling clays. Typical of these are the smectite clays. The term "swelling" refers to the expansion of the clays in the C-dimension of its natural crystalline state, when exposed to water. A schematic representation of a swelling clay, sodium montmorillonite, is illustrated in FIG. 1.

In the fully expanded state, the surface area of swelling clays is theoretically calculated to be of the order of 750 $m^2$/g. In practice this surface area is not available for reaction when clays are heated above 150° C. The reason for non-accessibility is the diffusion of interlayer solvent out of the clay layers at higher temperatures, causing strong layer to layer Van der Waal contacts. To circumvent this, a number of modifications have been proposed. Among the most successful is the intercalation of metal hydroxy polymer cations followed by heating above 200° C. In the literature this process is referred to as pillaring or cross-linking. Among the most widely exposed, inorganic polymers were synthesized by hydrolysis of water soluble salts of aluminum, iron, chromium, bismuth, magnesium, zirconium, and nickel at an appropriate pH. In addition, references are known where pillaring species are derived from molybdenum, niobium, silicon and other metal irons.

Commonly, pillared clays are prepared by ion exchange of cationically charged metal hydroxy polymers with sodium ions of clays. The typical exchange reactions are conducted at temperatures around 70° C. for three hours or at room temperature over a longer period of time. In the less common method, metal hydroxy polymers are synthesized by an in situ method in the interlayers. In this case, known amounts of metal salts and an inorganic base, sodium hydroxide, are stirred with clays at room temperature for a time longer than 10 hours. Typically the ratios of hydroxyl groups to metal are in the range of 1.5 to 3.0. It has been suggested that in this range of OH/metal ratios the polymers formed are of the biggest possible size. For pillaring, bigger size cations are preferred for two reasons. First, bigger cations interact more strongly with clay layers and thus would bond preferentially. Secondly, bigger cations provide higher C-dimension expansion.

In almost all of the work described in the literature, pillaring or cross-linking of clays is carried out by intercalation of only mono-metallic metal hydroxy polymers. This invention demonstrates pillaring of clays from a different perspective: to create multi-metallic intercalants. In the subject process, two distinctly different, chemically as well as physically, metal hydroxy polymers are intercalated in the same interlayer voids, see FIG. 2A. In addition, pillaring is also carried out using discretely synthesized multi-metallic hydroxy polymers prior to cation exchange reactions, see FIG. 2B. Such products are designed as mixed pillared clays (MPC). A schematic representation of both types of MPCs is provided in FIGS. 2A and 2B respectively.

Objects of the present invention are to provide techniques of producing novel pillared clays instrumental in enabling specific catalytic reactions to be carried out by virtue of the highly structured interlayers of the clays; to provide unique ways of producing high surface area clays where one pillar acts simply as an inert prop and the other pillar can be used to carry out catalytic reactions; and to enable generating metallic clusters of size that cannot be produced by other techniques. The small metallic clusters are extremely reactive and very important in catalyst applications. The use of multi-metallic discrete metal complexes would allow almost monoatomic separation of active metals sites in an inert matrix.

In U.S. Pat. No. 4,176,090 to David E. W. Vaughn et al. Example 13 describes an Al-Mg polymer for interlayerng smectite. However, the method of making this material is significantly different, i.e., it is solid state polymerization. There is no disclosure either of preparing a discrete, multi-metallic hydroxy polymer prior to cation exchange reaction with a swelling clay or of preparing two different metal hydroxy polymers and mixing them in desired proportions with the swelling clay.

In U.S. Pat. No. 4,271,043 to David E. W. Vaughn et al at column 5, lines 19-25, the term "copolymerizing" is used in a different sense. The actual purpose is to stabilize the colloidal system by addition of small amounts of sodium silicate and other compounds. As to what is absent from the disclosure, the above comments apply. A similar description is found in U.S. Pat. No. 4,248,739 at column 2, lines 30-33 and 55-62. Once more, this is not true copolymerization but the addition of separate cations to already polymerized species, see Example 12. This is much different from actual copolymerization.

Of general interest are U.S. Pat. Nos. 4,436,832 and 4,465,892, also U.S. Pat. No. 4,238,364.

Pillared clays may be utilized as adsorbents, catalysts, catalytic supports and for other purposes as discussed in the literature.

SUMMARY OF THE INVENTION

The MPCs (mixed pillared clays) are prepared by two different methods. In the first method, discrete cationic hydroxy polymers are synthesized using varying proportions of iron and aluminum salts followed by exchanging them for sodium ions of montmorillonite. When used in connection with this first method, the term "discrete" refers to a single, definite species with exactly defined proportions of each of the metals, viz., a definite organic complex or compound. In the second method, iron and aluminum polyhydroxy cations are prepared separately. These ions are then used to replace sodium ions of montmorillonite using varying stoichiometric amounts. The required stoichiometric amounts were calculated by determining what percent of clay cation exchange capacity should be satisfied by the aluminum hydroxy polymer and what percent by iron polyhydroxy cations to maintain charge neutrality. A list of MPCs synthesized using these techniques is provided in Table 1.

It should be noted that in both methods preparation of pillaring species is carried out before the clay is brought into contact therewith, viz., either a multi-metallic hydroxy polymer or at least two separate metal hydroxy polymers.

It will be seen from the from the following detailed description that the pillaring agents are prepared and used in the liquid phase so that these methods are essentially liquid phase methods.

DETAILED DESCRIPTION

Preparation of Sodium Montmorillonite

Figure 1:
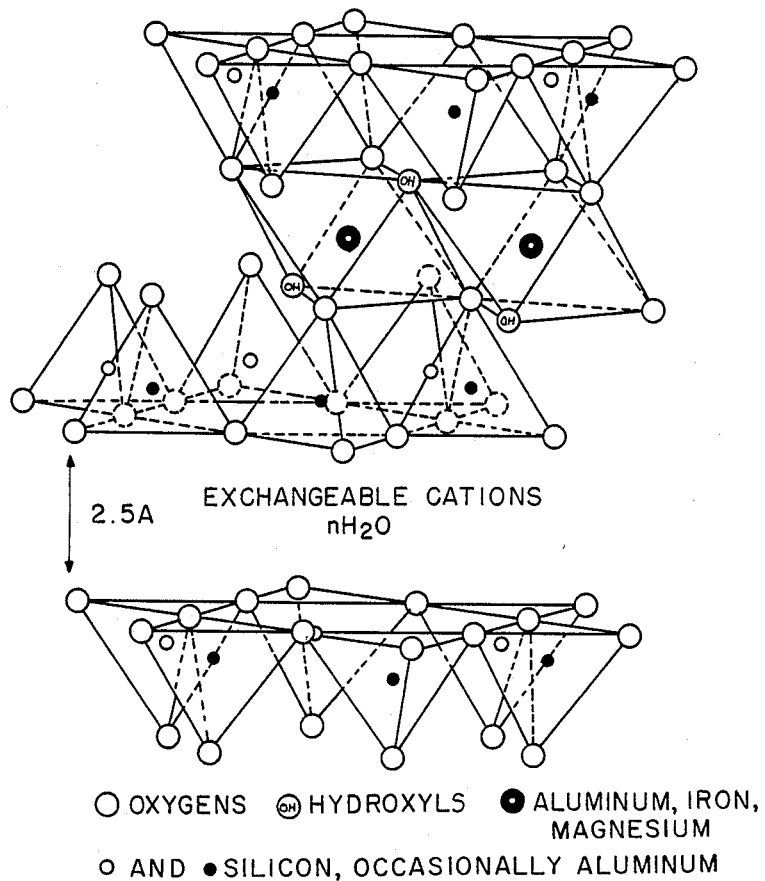
FIG. 1 illustrates the schematic structure of sodium montmorillonite.

The swelling clay, montmorillonite, used was a commercial product, Mineral Colloid B.P. supplied by Southern Clay Products, Inc. This montmorillonite was saturated with sodium ions by stirring with 1M sodium chloride for 24 hours. The sodium saturated clay was then washed free of excess salt and freeze dried. The cation exchange capacity (CEC) of sodium saturated montmorillonite was determined by re-exchange of sodium ions by ammonium and then analyzing for ammonium ions. The ammonium concentration was determined by Gailbraith Laboratory and reported as percent nitrogen. The percent nitrogen was then converted back to ammonium ion concentration. In the calculation correction was made for a very small amount of nitrogen that is found in natural clays. The cation exchange capacity determined by this method was 82 meq/100 g of montmorillonite. In the following discussion, the series PA-1, PA-2, etc., refers to pillaring agents designated by number; the series S-A, S-B, etc., refers to synthesis of pillared and mixed pillared clays, designated by letter.

Pillaring Agents

PA-1. $[Al_{13}O_4(OH)_{24}]Cl_7$

This aluminum hydroxy polymer was purchased from Reheis Chemicals Co. It is commercially known as Chlorohydrol. The active ingredient was 50% by weight.

PA-2. $[Fe_3(OH)_4]Cl_5$ 5.9845 g. of ferric trichloride hexahydrate supplied by Aldrich Chemicals Co. was dissolved in 225 mls. of distilled water. Then a solution containing 2.3469g. sodium carbonate in 100 mls. water was added slowly. The amount of metal chloride and sodium carbonate used would give an effective OH/M (hydroxyl to metal) ratio of 2.0. The resulting solution was aged at 95° C. for 36 hours. The end solution was extremely dark brown with a pH of 1.58. The stock solution of this polymer was prepared by making the solution exactly to 325 mls. Portions of this stock solution were used directly for pillaring reactions.

PA-3. $[Al_{12.5}Fe_{0.5}O_4(OH)_{24}]Cl_7$ 7.0666 g. of aluminum trichloride hexahydrate supplied by Aldrich Chemical Co. and 0.3164 g. of ferric trichloride hexahydrate were dissolved in 100 mls. of distilled water. Then a solution containing 0.3164 g of sodium carbonate in 50 mls. of water was added slowly, OH/M=2.5. The resulting solution was allowed to age at 95° for 36 hours to form a solution of discrete bimetallic hydroxy polymer containing aluminum and ferric ions in the ratio of 12.5/0.5. The pH of the final solution was 2.76 and was used directly for intercalation.

PA-4. $[Al_{10}Fe_3O_4(OH)_{24}]Cl_7$

The method of preparation of this polymer is essentially identical to the one used in the preparation of PA-3 except that the amounts of aluminum trichloride, ferric trichloride and sodium carbonate were 5.6536 g, 1.8984 g and 4.03249 g respectively. The OH/M ratio of the solution was 2.5. The final pH of the solution was 2.56. The entire solution was later used for pillaring.

PA-5. $[Al_6Fe_7O_4(OH)_{24}]Cl_7$

The method of preparation of this polymer is essentially identical to the one used in the preparation of PA-4, except that the amounts of aluminum trichloride, iron trichloride and sodium carbonate were 3.3951 g, 4.4329 g and 4.03569 g respectively. The OH/M ratio of the solution was 2.5. The final pH of the solution was 2.45 and the entire solution was used directly for intercalation.

Pillaring Agents Containing Enriched Iron-57 Isotopes

In order to study structures and chemical states of the pillars in MPCs, the Mossbauer technique was employed. In the technique, iron atoms are used as probe. Thus, two hydroxy polymer were prepared using Iron-57 enriched ferric trichloride.

Preparation of $^{57}$Fe Enriched Ferric Trichloride

A stock solution of FeCl$_3$ was prepared by dissolving 0.0144 g of ferric oxide, 93.7% enriched with $^{57}$Fe, in 2 ml. of concentrated hydrochloric acid (12M) at room temperature and diluting to 10 mls. with distilled water. The resulting solution contained 0.002439 g. of $^{57}$Fe enriched ferric chloride per milliliter of the solution. Isotope enriched ferric oxide was obtained from the Isotope Division of the Oak Ridge National Laboratory.

Preparation of $^{57}$Fe Enriched Pillaring Agents

PA-6. $[Al_{12.5}Fe_{0.5}O_4(OH)_{24}]Cl_7$ for MPC-1

5.6580 g. of AlCl$_3$.6H$_2$O and 0.2497 g. of non-enriched FeCl$_3$.6H$_2$O were dissolved in 98 mls. of water, followed by addition of 1.5 ml. of a stock solution containing enriched ferric chloride. The solution was allowed to mix for five minutes. Then a solution containing 3.4150 g of sodium carbonate in 50 mls. of water was added slowly. The amount of sodium carbonate added was enough to neutralize excess hydrochloric acid, used to prepare enriched ferric chloride, and also to give an OH/M ratio of 2.5. The resulting solution was aged to 95° C. for 36 hours; pH=2.1. The entire solution was later used for pillaring. The use of enriched iron gave 63% enrichment of $^{57}$Fe in the polymer over an identical polymer containing no enriched ferric ions.

PA-7 [Fe$_3$(OH)$_4$]Cl$_5$ for PC-2

This pillaring agent is prepared using unenriched and enriched ferric trichlorides. 1.2300 g. of unenriched ferric chloride was dissolved in 75 mls. of water. Then 1.0 ml. solution of enriched ferric chloride was added. This was followed by addition of a solution containing 0.6076 g. of sodium carbonate in 25 mls. of water. Once again the amount of sodium carbonate was enough to neutralize excess HCl; and provide an OH/M ratio of 2.0. The resulting solution was aged at 95° C. for 36 hours and used in its entirety for the preparation of pillared clay. The enrichment of $^{57}$Fe in the final polymer was 8.6%.

PA-8 [Fe$_3$(OH)$_4$]Cl$_5$ for MPC-4

The general method of preparation is similar to that described in the synthesis of PA-7. However, the amounts of unenriched ferric chloride, enriched ferric chloride and sodium carbonates were 1.3224 g, 3 mls. and 0.8945 g respectively. The amount of enriched ferric chloride used was enough to give 24% enrichment of $^{57}$Fe in the final polymer.

PA-9. [Fe$_3$(OH)$_4$]Cl$_5$ for MPC-5

The general method of preparation is similar to that described in the synthesis of PA-7. However, the amounts of unenriched ferric trichloride, enriched ferric trichloride and sodium carbonate were 0.8618 g, 2.5 mls. and 0.6488 g respectively. The amount of enriched ferric chloride used was enough to give 31% enrichment of $^{57}$Fe in the final polymer.

Preparation of Pillared and Mixed Pillared Clays

S-A. Synthesis of Aluminum Pillared Clay (PC-1)

This pillared clay was prepared according to the procedure described in the literature by Pinnavaia et al. In the procedure, 5.0 g. of freeze-dried sodium saturated montmorillonite was slurried in 500 mls. of water to form a suspension of about 1.0% by weight. This slurry was slowly added to a solution containing 5.0207 g of Chlorohydrol in 50 mls. of water with vigorous stirring. The amount of Chlorohydrol used was equivalent to four times CEC (cation exchange capacity) of 5.0 g. of montmorillonite. The resulting slurry was stirred at 65° for two hours, cooled and washed repeatedly with distilled water to remove excess unexchanged pillaring agent. The pillared clay was then freeze-dried.

S-B. Synthesis of Iron Pillared Clays (PC-2)

The pillaring species was [Fe$_3$(OH)$_4$]Cl$_5$. The cation exchange procedure to produce the pillared clay was identical to the one described in the method of S-A except that this time 150 mls. of a stock solution of pillaring agent, PA-2, was used. The amount of pillar in the stock solution used was equivalent to four times available CEC of 5.0 g of sodium montmorillonite.

S-C. Synthesis of Mixed Pillared Clay (MPC-1)

The amount of sodium montmorillonite and cation exchange procedure were identical to that of method S-B except that this time the entire amount of pillaring agent, [Al$_{12.5}$Fe$_{0.5}$O$_4$(OH)$_{24}$]Cl$_7$, prepared as PA-3, was added to the slurry. The amount of pillar used was four times the cation exchange capacity of the clay used.

S-D. Synthesis of Mixed Pillared Clay (MPC-2)

The amount of sodium montmorillonite and cation exchange procedure were identical to that of method S-C except that this time the entire amount of pillaring agent, [Al$_{10}$Fe$_3$O$_4$(OH)$_{24}$]Cl$_7$, prepared as PA-4, was added to the slurry. The amount of pillar was four times the cation exchange capacity of the clay used.

S-E. Synthesis of Mixed Pillared Clay (MPC-3)

The amount of sodium montmorillonite and cation exchange procedure were identical to that of method S-D except that this time the entire amount of pillaring agent, [Al$_6$Fe$_7$O$_4$(OH)$_{24}$]Cl$_7$, prepared as PA-5, was added to the slurry. The amount of pillar was equivalent to four times the cation exchange capacity of the clay used.

S-F. Synthesis of Mixed Pillared Clay (MPC-4)

In the synthesis of this pillared clay two discrete polymers, Chlorohydrol and [Fe$_3$(OH)$_4$]Cl$_5$, are used in the stoichiometric amounts so that each would satisfy 50% CEC of sodium montmorillonite. Appropriate adjustments were applied in the calculation of the amounts of pillaring agents required considering the cationic charges of Chlorohydrol and [Fe$_3$(OH)$_4$]Cl$_5$ to be 7+ and 5+ respectively. The pillaring reaction was as follows. 5.0 g. of sodium montmorillonite was dispersed in 500 mls. of distilled water and stirred for 24 hours. This slurry was then added to the solution containing 2.5104 g. of Chlorohydrol and 75 mls. of a stock solution of [Fe$_3$(OH)$_4$]Cl$_5$, PA-2. The resulting slurry was stirred at 65° C. for two hours, cooled, washed free of unexchanged pillaring agents and freeze-dried.

S-G. Synthesis of Mixed Pillared Clay (MPC-5)

The amount of sodium montmorillonite, pillaring agents and the exchange process were identical to that used in the method S-F except, that the amount of iron pillar was 100 mls. of a stock solution of PA-2 and 1.2552 g of Chlorohydrol was used. These amounts translate to 75% CEC compensated by the iron pillar and the remaining 25% by the aluminum hydroxy polymer, Chlorohydrol.

Preparation of $^{57}$Fe Enriched Mixed Pillared Clays

S-H. Synthesis of Iron Pillared Clay (PC-2)

Essentially the procedure and pillaring species were the same as method S-B, except that the pillaring agent was PA-7. the amount of clay used was 2.5 g. The amount of pillaring agent was equivalent to three times CEC of the montmorillonite.

S-I. Synthesis of Mixed Pillared Clay (MPC-1)

Essentially the procedure and pillaring species were the same as method S-C, except that the pillaring agent was PA-6. The amount of clay used was 4.0 g. The amount of pillaring agent used was equivalent to three times CEC of the montmorillonite.

S-J. Synthesis of Mixed Pillared Clay (MPC-4)

Essentially the procedure and pillaring species were identical to that of method S-F, except that one component of the iron pillaring agent was PA-8. The amount of clay used was 4.0 g. The amount of pillaring agents used was equivalent to three times CEC of the montmorillonite.

S-K. Synthesis of Mixed Pillared Clay (MPC-5)

Essentially the procedure and pillaring species were identical to method S-G, except that one component of the iron pillaring agent was PA-9. The amount of clay was 2.5 g. The amount of pillaring agents used was equivalent to three times CEC of montmorillonite.

Characterization

X-Ray Diffraction

Basal spacings of sodium montmorillonite and all pillared clays, freeze-dried and after heating at various temperatures, were measured using Diablo X-ray diffractometer. Copper K was the source of X-ray radiation, =1.5405 A. The samples were scanned from 2.0 to 35.0 degree at step scan of 0.02 and scanning rate of 1° per minute. XRD samples for XRD were prepared by powder pack technique.

Surface Area

Surface area of sodium montmorillonite and pillared clays, freeze-dried and after heating at various temperatures, were measured using BET surface area equipment of Micromeritics. All samples were outgassed at 150° C. using helium as carrier gas. The measurements were conducted at liquid nitrogen temperature.

Thus high surface area pillared clays were prepared from naturally occurring montmorillonite by exchanging interlayer ions with polyoxocations containing: (1) iron, (2) aluminum, (3) discrete mixtures of (1) and (2), or (4) iron and aluminum contained within the same complex.

All freeze-dried pillared clays were in the form of powders wherein the colors varied with the nature of the pillaring species. Aluminum pillared clay is white whereas iron pillared clay is deep brown. Mixed pillared clays prepared by intercalation of discrete complexes, MPC 1 to 3, see Table 1, tend to be very light brown, whereas MPC 4 and 5 prepared by intercalation with stoichiometric methods, retain the brown color but the intensity depends on the amount of iron hydroxy polymer used. These results are a qualitative indicator of the differences in the pillaring species and also the pillared clays. In addition, the thixotropic characteristic of $Na^+$-montmorillonite in water changed significantly on pillaring.

Figure 3:
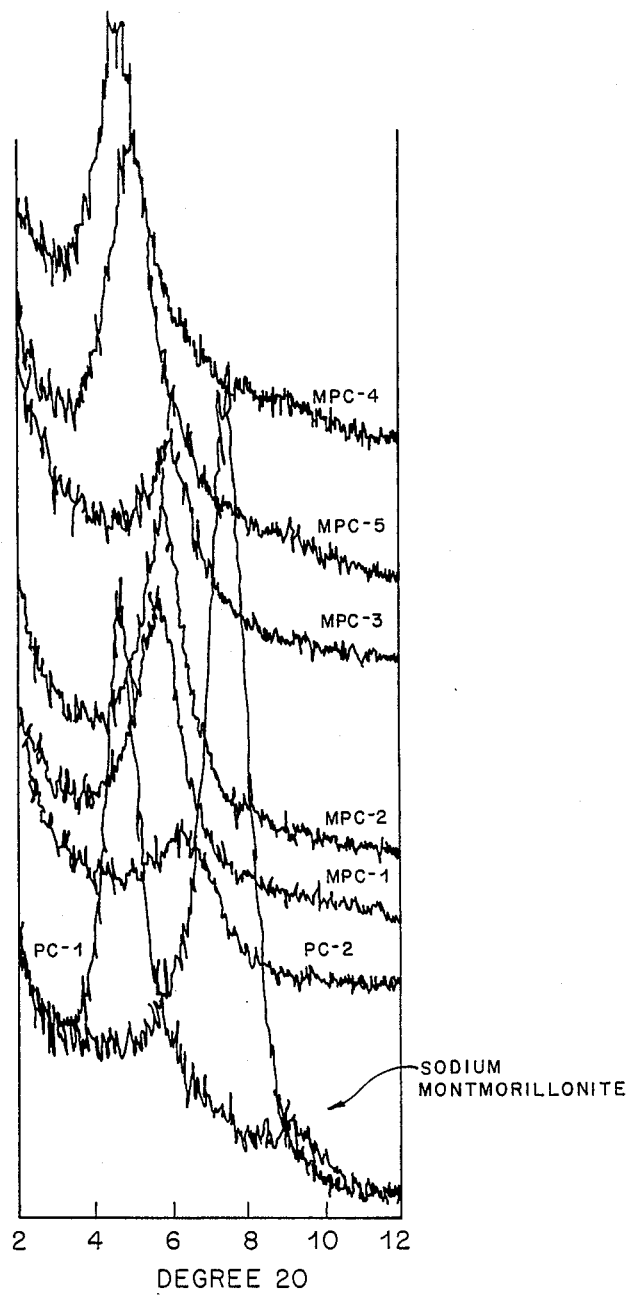
FIG. 3 shows the basal spacings of various clays after drying at room temperature.

The surface areas of all pillared clays, regardless of the method of preparation or pillaring species per se, are an order of magnitude higher than that of the starting clay, sodium montmorillonite, see Table 2. The increase in surface area is an indication of the better accessibility of the lattice surface, a direct consequence of layer expansion by pillaring, which is confirmed by simultaneous increase in the basal spacing, $d_{001}$, in the range of 2 to 7 A, on pillaring, see Table 3 and FIG. 3.

Figure 5:
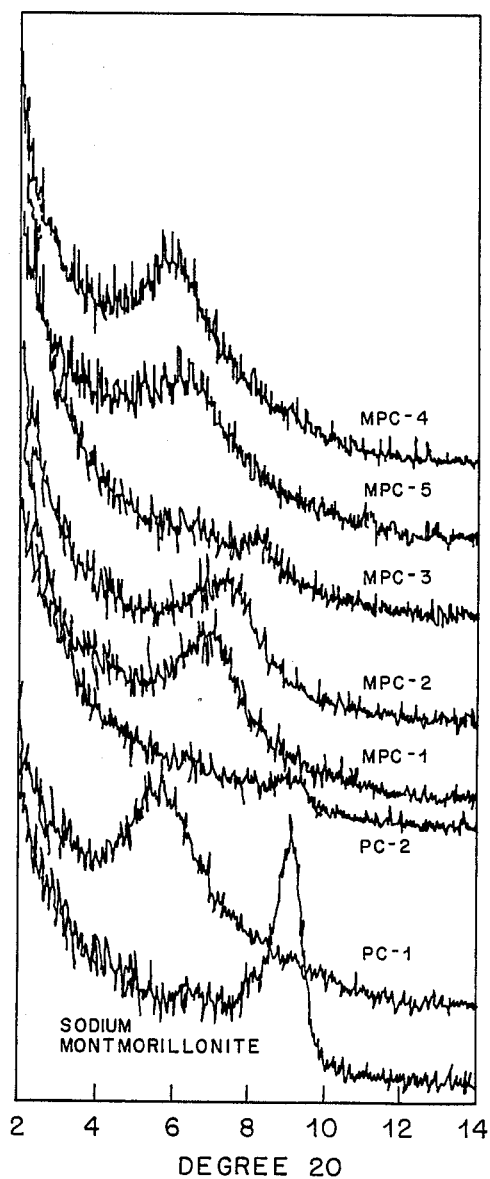
FIG. 5 shows the basal spacings of the clays after drying at 550° C.

The stability of the lattice expansion, the true distinction of pillaring, over the ordinary ion exchange process is discerned by subjecting sodium montmorillonite in comparison with pillared clays to various temperatures and monitoring the surface area in connection with lattice expansions. The data are compiled in Tables 2 and 3. It is expected that the lattice expansion would be maintained only in truly pillared clays when subjected to temperatures exceeding 250° C. Interlayer opening (ILO), indicator of lattice expansion, of simple ion exchanged clay, viz., sodium montmorillonite, after heating above 300° C. is about 0.5 A. Except for PC-2, all MPCs and PCs under study exhibit ILO higher than 2. A, even after subjection to 550° C., see FIG. 5, indicating true pillaring of the clays.

Figure 4:
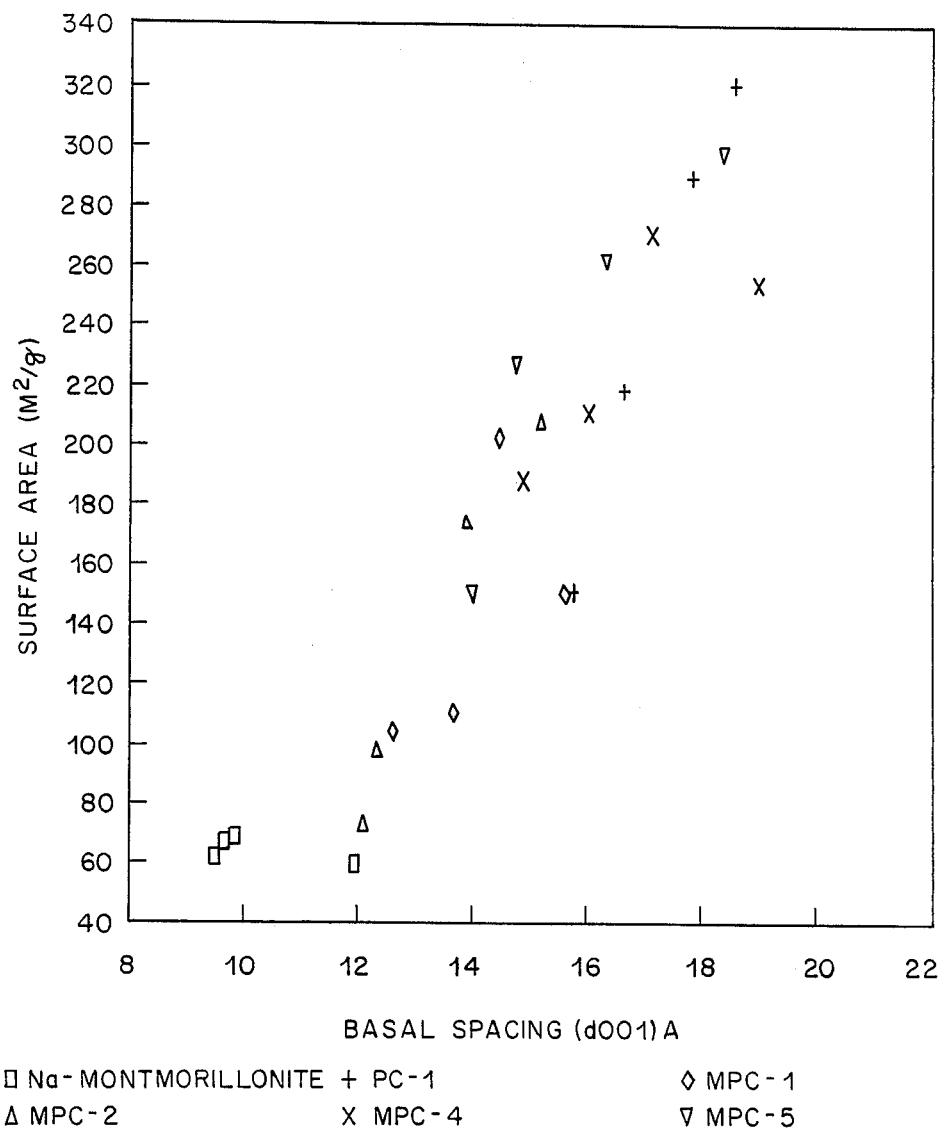
FIG. 4 shows the effect of basal spacing on surface area.

In general, and independently of the pillaring species, surface area decreases with increased temperature. In addition, decrease in surface area is accompanied by decrease in basal spacing. Typical trends of surface area vis. basal spacings are illustrated in FIG. 4.

Apparently PC-2 seems to exhibit an anomalous trend. The surface area of 219 $m^2/g$ is much higher than expected from the basal spacing of 9.68 A. One possible explanation could be the spillover of pillaring species, $[Fe_3(OH)_4]^{5+}$, out of the interlayers on heating above 300° C. which would cause collapse of the lattice expansion. The observed high surface area can be associated with formation of external fine iron oxide, a consequence of this spillover.

Both lattice expansion and surface area of all MPCs fall between those of the two end member pillared clays, PC-1 and PC-2. In case of MPC 1 to 3, prepared using discrete hydroxy polymers, basal spacing decreases with increasing ferric ions in the hydroxy polymers. This trend persists at all temperatures, see Table 3. Such trend is expected based on the structural changes that can occur when aluminum is replaced by ferric ions in discrete hydroxy polymers. The same trend is seen in surface area for MPC 1 and 2 but not for MPC-3, Table 2. In this regard MPC-3 acts like PC-2. It is possible that under the given ferric ion substitution level, pillar structure breaks down much more rapidly followed by a spillover mechanism similar to that described for PC-2.

In the case of MPC-4 and MPC-5, both surface areas and basal spacings are like PC-1, see Tables 2 and 3, which supports the view that aluminum hydroxy polymers form stable pillars even at a level much lower than PC-1. In addition, these results are extremely important in demonstrating the feasibility of using a very small amount of inert pillars, for example aluminum hydroxy polymer, to achieve desired lattice expansion and using reactive pillars, such as iron hydroxy polymers, for further reactions. Thus other combinations such as Al hydroxy polymer with one or more of Fe, Cr, Co and Cu or other transition metal hydroxy polymer may be employed. The invention may therefore be employed to provide pillared clays that can be subjected to reduction to produce metal sites such as finely dispersed metallic iron domains, or in lieu of iron, other reducible and catalytically active metals. It is worth noting that even with MPC-4, and MPC-5, surface areas and basal spacings decrease with the amount of iron pillaring agents. However the effect is substantially lower than observed with MPCs prepared using discrete hydroxy polymers.

Figure 2A:
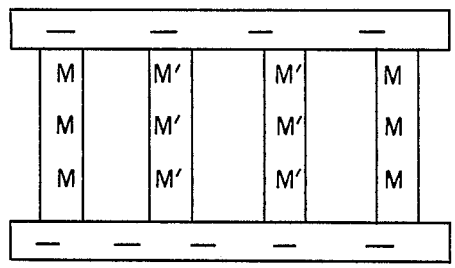
FIG. 2A illustrates the hypothetical schematic structure for pillaring with mixed metal hydroxy polymers.
Figure 2B:
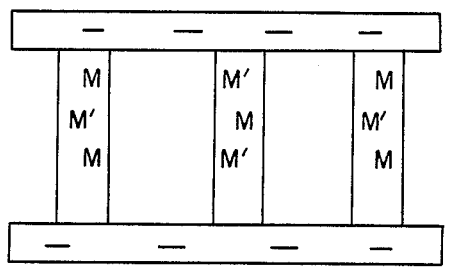
FIG. 2B illustrates the hypothetical schematic structure for pillaring with a discretely synthesized multi-metallic hydroxy polymers, viz., alloy pillars.

The surface areas and basal spacings of the MPCs clearly illustrate the formation of bimetallic pillars in the interlayers of montmorillonite and confirm that these species are unique and different. In addition this invention demonstrates the application of two distinctly different methods of preparing multi-metallic pillared clays. However the choice of method would depend upon the eventual objective and intended applications. The use of a discrete hydroxy polymer would enable substitution of active metallic centers witin the matrix of inert pillars, see FIG. 2B, whereas the stoichiometric process would be useful to produce active pillars aided by inert pillars to keep the lattice expanded, see FIG. 2A.

Reduction Behavior

A sample of MPC-5 was subjected to reduction with hydrogen gas for two hours at 673K. The Mossbauer spectral area belonging to metallic iron was 45.5%.

A sample of MPC-5 was subjected to the following treatment sequence: (1) reduction at 673K in flowing hydrogen gas for 2 hours, (2) exposure to air at 298K for 12 hours and (3) reduction again in hydrogen at 673K for 2 hours. The last two steps were repeated. Observations made following each redox cycle indicated that the reduced iron particles could be reformed to their initial dimensions in the absence of sintering during the redox cycles.

Reduction to the iron phase can be enhanced by addition of platinum to the sample.

It can thus be seen that mixed pillared clays exhibit good thermal stabilities and higher surface areas. The MPCs prepared by intercalation of a discrete hydroxy polymer tend to be the less stable of the two types shown. The stability of the MPCs depends on the amount of iron substitution or the amount of iron pillaring agent used.

TABLE I

List of Pillared and Mixed Pillared Clays

| Designation of Clays | Pillaring Cations | Percent CEC | Sample Classification |
|---|---|---|---|
| PC-1 | $[Al_{13}O_4(OH)_{24}]Cl_7$ | 100 | Discrete |
| PC-2[a] | $[Fe_3(OH)_4]Cl_5$* | 100 | Discrete |
| MPC-1[a] | $[Al_{12.5}Fe_{0.5}O_4(OH)_{24}]Cl_7$ | 100 | Discrete |
| MPC-2 | $[Al_{10}Fe_3O_4(OH)_{24}]Cl_7$ | 100 | Discrete |
| MPC-3 | $[Al_6Fe_7O_4(OH)_{24}]Cl_7$ | 100 | Discrete |
| MPC-4[a] | $[Al_{13}O_4(OH)_{24}]Cl_7$ | 50 | Stoichiometric |
|  | $[Fe_3(OH)_4]Cl_5$* | 50 |  |
| MPC-5[a] | $[Al_{13}O_4(OH)_{24}]Cl_7$ | 25 | Stoichiometric |
|  | $[Fe_3(OH)_4]Cl_5$* | 75 |  |

*The exact chemical composition of iron hydroxy polymer formed in solution is not fully established. Thus we have used this composition for all practical calculations based on most stable species.
[a]These MPCs were also prepared using $^{57}$Fe enriched hydroxy polymers.

TABLE 2

Nitrogen BET Surface Area of Pillared and Mixed Pillared Clays After Treating at Various Temperatures[a]

| Clays | Surface Area $M^2/G$ | | | |
|---|---|---|---|---|
|  | 25° C. | 300° C. | 450° C. | 550° C. |
| Na-Clay | 60 | 62 | 69 | 67 |
| PC-1 | 320 | 289 | 218 | 151 |
| PC-2 | 218 | 213 | 214 | 219 |
| MPC-1 | 150 | 202 | 110 | 104 |
| MPC-2 | 208 | 175 | 98 | 73 |
| MPC-3 | 254 | 248 | 238 | 211 |
| MPC-4 | 253 | 270 | 210 | 188 |
| MPC-5 | 297 | 261 | 227 | 150 |

[a]Clays were heated at appropriate temperature for 45 minutes and cooled in a desiccator.

TABLE 3

Basal Spacing of Pillared and Mixed Pillared Clays After Treating at Various Temperatures[a]

| Clay | Basal Spacing $d_{001}$ Å | | | |
|---|---|---|---|---|
|  | 25° C. | 300° C. | 450° C. | 550° C. |
| Na-Clay | 11.94 | 9.5 | 9.85 | 9.66 |
| PC-1 | 18.59 | 17.84 | 16.66 | 15.77 |
| PC-2 | 13.80 | 9.71* | 10.74* | 9.68* |
| MPC-1 | 15.63 | 14.48 | 13.69 | 12.62* |
| MPC-2 | 15.22 | 13.91 | 12.35* | 12.1* |
| MPC-3 | 14.72 | 13.91* | 12.44* | 13.2* |
|  |  |  |  | 10.7* |
| MPC-4 | 18.99 | 17.14 | 16.05 | 14.90* |
| MPC-5 | 18.39 | 16.35 | 14.78 | 14.00[b] |

[a]Clays were heated at appropriate temperature for 45 minutes and cooled in a desiccator prior to basal spacing measurements.
*Basal spacing were highly interstratified.
[b]The $d_{001}$ peak was relatively broad.

What is claimed is:

1. A process of preparing a mixed pillared clay which consists essentially of forming an aluminum hydroxy polymer and forming an iron hydroxy polymer, in the liquid phase, and mixing said liquid phase polymers with a swelling clay to form a mixed pillared clay, using a proportion of each individual polymer that will satisfy a selected percentage of the cation exchange capacity of the clay.

2. The process as set forth in claim 1 in which the proportion of one individual polymer will satisfy from about 25% to about 75% of the cation exchange capacity of the clay and the proportion of the other individual polymer will satisfy from about 75% to about 25%.

3. A process of preparing a mixed pillared clay which consists essentially of forming an aluminum hydroxy polymer and forming a transition metal hydroxy polymer, in the liquid phase, and mixing said liquid phase polymers with a swelling clay to form a mixed pillared clay, using a proportion of each individual polymer that will satisfy a selected percentage of the cation exchange capacity of the clay.

4. A process as set forth in claim 3 in which one or more than one transition metal hydroxy polymer may be employed wherein the metal is selected from the class consisting of Fe, Cr, Co and Cu.

* * * * *